United States Patent
Fujita

(10) Patent No.: US 11,393,467 B2
(45) Date of Patent: Jul. 19, 2022

(54) ELECTRONIC DEVICE, CONTROL METHOD, AND STORAGE MEDIUM

(71) Applicant: CANON KABUSHIKI KAISHA, Tokyo (JP)

(72) Inventor: Shunji Fujita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 268 days.

(21) Appl. No.: 16/660,188

(22) Filed: Oct. 22, 2019

(65) Prior Publication Data
US 2020/0135196 A1    Apr. 30, 2020

(30) Foreign Application Priority Data

Oct. 31, 2018    (JP) .............................. JP2018-205868

(51) Int. Cl.
*G10L 15/22*    (2006.01)
*G10L 15/08*    (2006.01)

(52) U.S. Cl.
CPC .............. *G10L 15/22* (2013.01); *G10L 15/08* (2013.01); *G10L 2015/088* (2013.01); *G10L 2015/223* (2013.01)

(58) Field of Classification Search
CPC ......... G10L 15/22; G10L 15/00; G10L 15/08; G10L 15/18; G10L 15/183; G10L 15/26; G10L 15/28; G10L 15/30; G10L 2015/221–228

USPC .... 704/275, 270, 1, 231, 235, 244, 250, 251
See application file for complete search history.

(56) References Cited

U.S. PATENT DOCUMENTS

| 10,271,093 B1* | 4/2019 | Jobanputra .......... H04N 21/835 |
| 2018/0197533 A1* | 7/2018 | Lyon ....................... G10L 15/02 |
| 2020/0051554 A1* | 2/2020 | Kim ....................... G06F 3/167 |

FOREIGN PATENT DOCUMENTS

JP    2015-013351 A    1/2015

* cited by examiner

*Primary Examiner* — Qi Han
(74) *Attorney, Agent, or Firm* — Canon U.S.A., Inc. IP Division

(57) ABSTRACT

An electronic device includes a voice receiving unit configured to receive a voice input, a first communication unit configured to communicate with an external device having a voice recognition function, and a control unit. The control unit receives a notification indicating whether the external device is ready to recognize the voice input, via the first communication unit. In a case where the notification indicates that the external device is not ready to recognize the voice input, the control unit controls the external device to be ready to recognize the voice input via the first communication unit when a predetermined voice input including a phrase corresponding to the external device is received through the voice receiving unit.

25 Claims, 12 Drawing Sheets

FIG.4

| POWER SUPPLY STATE | DETAILS OF POWER SUPPLY STATE |
|---|---|
| PS0 | TURN OFF POWER SUPPLY OF ALL PROCESSING UNITS |
| PS1 | TURN OFF POWER SUPPLY OF VOICE RECEIVING UNIT 207, VOICE OUTPUT UNIT 208, AND WIRELESS LAN COMMUNICATION UNIT 209 |
| PS2 | TURN ON POWER SUPPLY OF ALL PROCESSING UNITS |

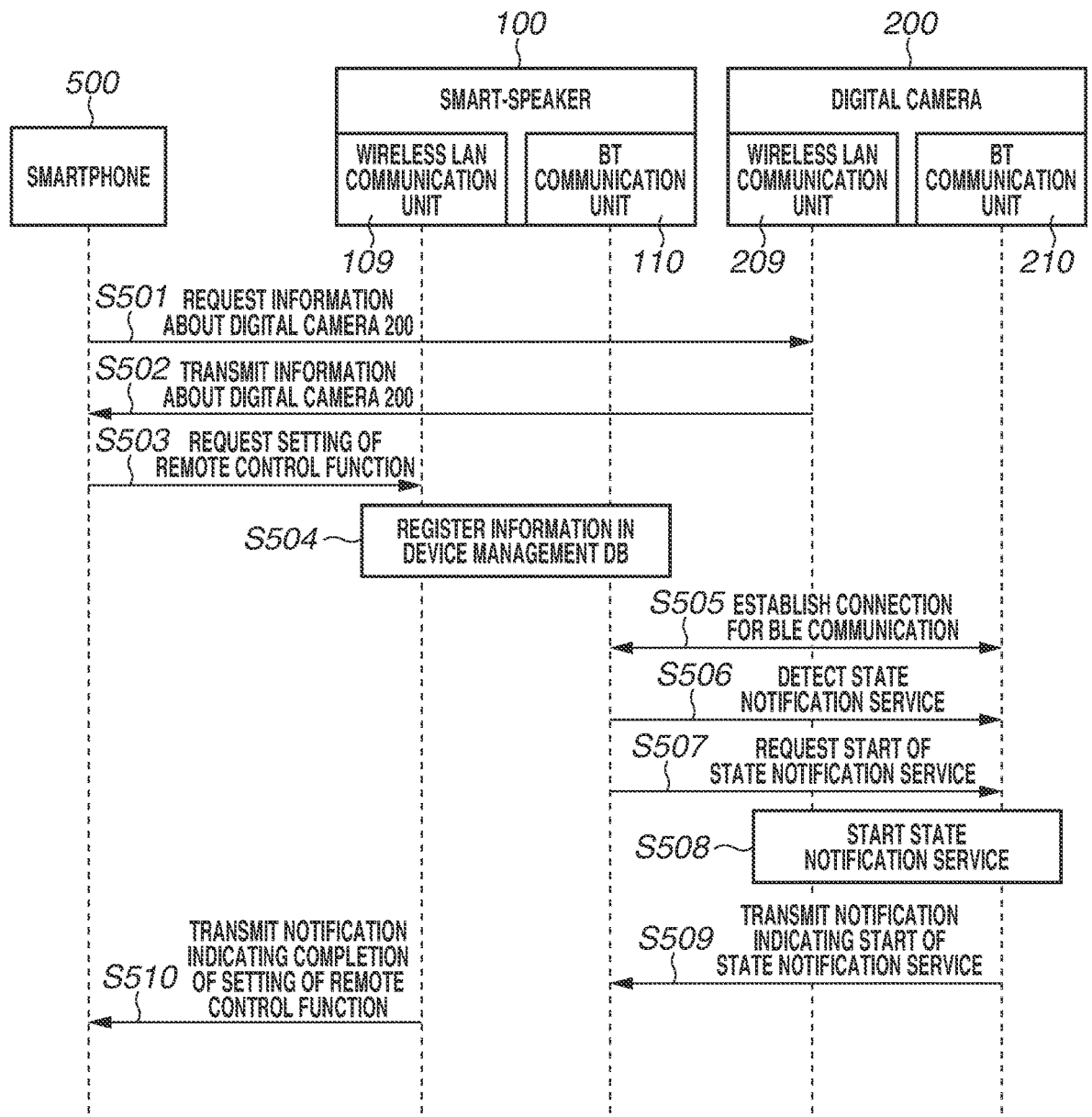

FIG.6A

| ID | DEVICE NAME | BD ADDRESS | WAKE WORD | STATE OF VOICE CONTROL FUNCTION |
|---|---|---|---|---|
| 1 | SMART-SPEAKER | 123456789abc | INDY | ON |
| 2 | DIGITAL CAMERA | 665544332211 | THOMAS | — |

FIG.6B

| ID | DEVICE NAME | BD ADDRESS | WAKE WORD | STATE OF VOICE CONTROL FUNCTION |
|---|---|---|---|---|
| 1 | SMART-SPEAKER | 123456789abc | INDY | ON |
| 2 | DIGITAL CAMERA | 665544332211 | THOMAS | OFF |

FIG.6C

| ID | DEVICE NAME | BD ADDRESS | WAKE WORD | STATE OF VOICE CONTROL FUNCTION |
|---|---|---|---|---|
| 1 | SMART-SPEAKER | 123456789abc | INDY | ON |
| 2 | DIGITAL CAMERA | 665544332211 | THOMAS | ON |

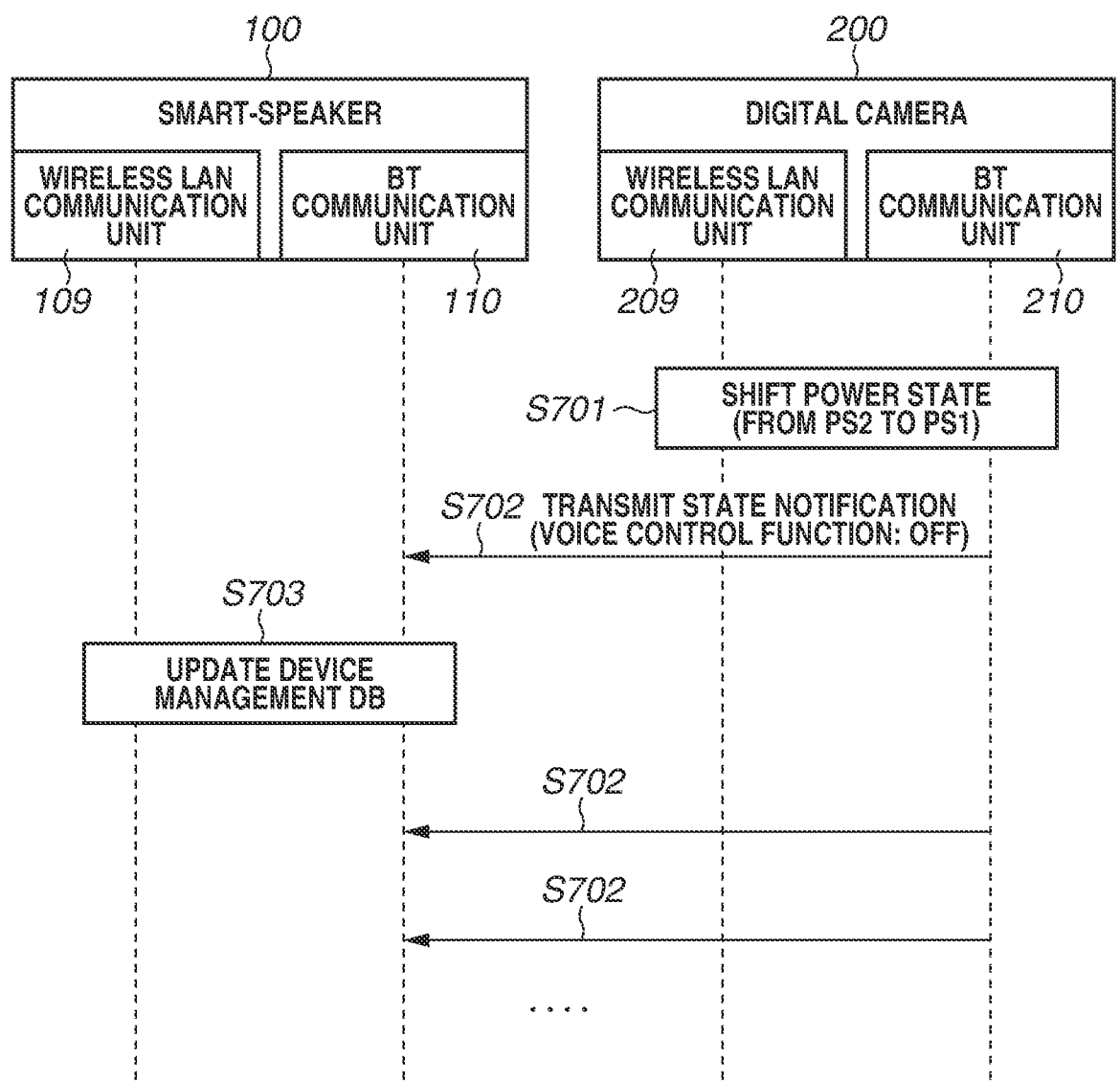

ELECTRONIC DEVICE, CONTROL METHOD, AND STORAGE MEDIUM

BACKGROUND

Field

The present disclosure relates to an electronic device capable of recognizing a voice input.

Description of the Related Art

In recent years, with the improvement in a voice recognition technique, a technique called a voice control function which enables a user to operate an electronic device through a voice input has been known. For example, Japanese Patent Application Laid-Open No. 2015-013351 discusses a communication robot which processes a voice input on a network that is received through a microphone, and vocally responds to that voice input.

SUMMARY

However, it has now been determined that with respect to conventional voice recognition, in order to prevent a device from operating with a voice which the user has produced without intention of inputting an instruction to the device, there is a use case in which the user turns on the voice control function only when the voice control function is to be used and turns off the voice control function for the rest of time. In the above-described use case, if the voice control function of the device is OFF, the user cannot use the voice control function unless the user manually turns on the voice control function.

In consideration of the above-discussed issues, according to an aspect of the present disclosure, an electronic device includes a voice receiving unit configured to receive a voice input, a first communication unit configured to communicate with an external device having a voice recognition function, and a control unit, wherein the control unit receives a notification indicating whether the external device is ready to recognize the voice input via the first communication unit, and wherein, in a case where the notification indicates that the external device is not ready to recognize the voice input, the control unit controls the external device to be ready to recognize the voice input via the first communication unit when a predetermined voice input including a phrase corresponding to the external device is received through the voice receiving unit.

Further features of the present disclosure will become apparent from the following description of exemplary embodiments with reference to the attached drawings.

BRIEF DESCRIPTION OF THE DRAWINGS

FIG. 4 is a table illustrating an example of a power supply state of the digital camera according to the first exemplary embodiment.

FIG. 5 is a sequence diagram illustrating an example of processing for setting a remote control function of the smart-speaker according to the first exemplary embodiment.

FIGS. 6A, 6B, and 6C are tables illustrating examples of a device management database (DB) according to the first exemplary embodiment.

FIG. 7 is a sequence diagram illustrating an example of processing which allows the smart-speaker according to the first exemplary embodiment in a power supply state PS2, to acquire information about an operation state of a voice control function of the digital camera.

FIG. 10 is a sequence diagram illustrating an example of processing of the remote control function executed when the voice control function of the digital camera according to the first exemplary embodiment is ON.

DESCRIPTION OF THE EMBODIMENTS

Hereinafter, an exemplary embodiment of the present disclosure will be described in detail with reference to the appended drawings.

<System Configuration>

Figure 1:
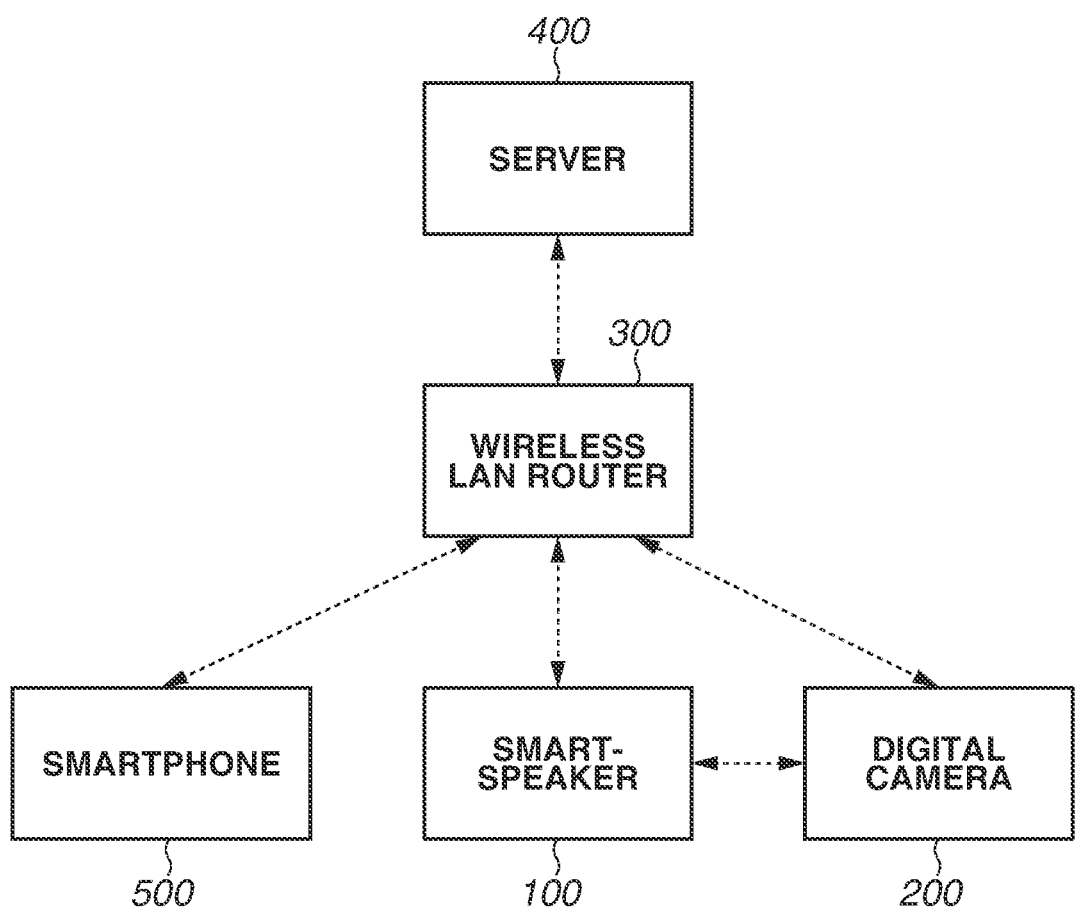
FIG. 1 is a diagram illustrating a system configuration according to a first exemplary embodiment.

FIG. 1 is a diagram illustrating a system configuration according to the first exemplary embodiment. The system described in the present exemplary embodiment is configured of a smart-speaker 100, a digital camera 200, a wireless local area network (LAN) router 300, a server 400, and a smartphone 500.

The smart-speaker 100 is an electronic device having a voice control function. The voice control function is a function for executing a user command by determining the command based on a voice input. Generally, an electronic device having the voice control function firstly recognizes a predetermined word (a so-called "wake word") included in a received voice input and determines the voice input following after the wake word. In the present exemplary embodiment, the smart-speaker 100 transmits the received voice input, to a server 400 connected thereto via a wireless LAN network, and determines a command based on the voice input by using the server 400. The smart-speaker 100 and the below-described digital camera 200 of the present exemplary embodiment internally recognize the wake word, and determine the voice input following the wake word by using the server 400.

The smart-speaker 100 operates by receiving power from an external power supply such as a commercial power supply. The smart-speaker 100 is connected to the wireless LAN router 300 and the server 400. Further, the smart-speaker 100 can communicate with the digital camera 200 according to a communication standard compliant with the Bluetooth® Low Energy (BLE). The smart-speaker 100 acquires information about an operation state of the voice control function of the digital camera 200.

The digital camera 200 is a device having a voice control function. The digital camera 200 includes an electric cell such as a lithium-ion cell or battery, and operates receiving power from the electric cell. Because an amount of electric power which the electric cell can store is finite, the user would like to save the power consumption of the digital camera 200 as much as possible. Therefore, the voice control function and the wireless LAN function of the digital camera 200 is usually turned off, and the user enables the functions as necessary. A configuration of the digital camera 200 of the present exemplary embodiment is also applicable to devices such as a smartphone and a tablet terminal.

The wireless LAN router 300 forms a wireless LAN network. The smart-speaker 100, the digital camera 200, and the below-described smartphone 500 can execute wireless LAN communication via the wireless LAN network formed by the wireless LAN router 300. Further, the smart-speaker 100 and the digital camera 200 can communicate with the server 400 via the wireless LAN router 300.

The server 400 provides a service for recognizing a command based on a voice input. For example, the server 400 provides a service for converting voice data into characters or sentences and a service for analyzing characters or sentences to convert the characters or sentences into an instruction to the digital camera 200. By using the service provided by the server 400, the user can easily execute processing that is rather burdensome for a portable electronic device such as the smartphone 500 or the digital camera 200. The smart-speaker 100 and the digital camera 200 analyze an input voice using a service provided by the server 400.

The smartphone 500 executes various settings of the smart-speaker 100 via the wireless LAN communication. Specifically, an application for executing the various settings of the smart-speaker 100 is installed in the smartphone 500.

In the system configuration illustrated in FIG. 1, the smart-speaker 100 of the present exemplary embodiment has a function for remotely controlling a part of the voice control function of the digital camera 200. If a user speaks to the digital camera 200 when the voice control function is not operating, the smart-speaker 100 receives the user's voice input and enables the voice control function of the digital camera 200. Further, the smart-speaker 100 can transmit the received voice data to the digital camera 200 and remotely control the digital camera 200 to execute a function corresponding to that received voice data. Details of remote control will be described below with reference to FIGS. 9 and 10.

<Configuration Example of Smart-Speaker 100>

Figure 2:
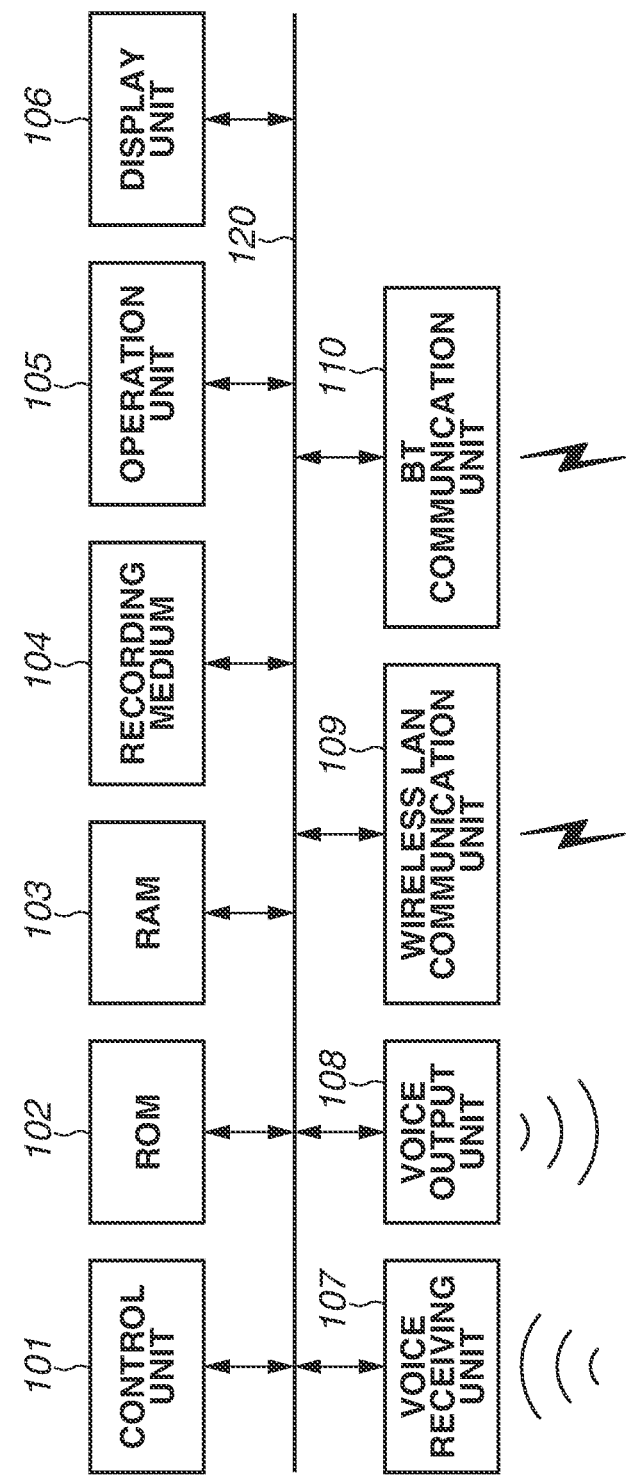
FIG. 2 is a block diagram illustrating an example of a configuration of a smart-speaker according to the first exemplary embodiment.

FIG. 2 is a block diagram illustrating an example of a configuration of the smart-speaker 100.

A control unit 101 controls respective units of the smart-speaker 100 according to an input signal or a program stored in a read only memory (ROM) 102. For example, the control unit 101 is configured of one or more processors such as central processing units (CPUs) or micro processing units (MPUs). In addition, the entirety of the device may be controlled by a plurality of pieces of hardware by sharing the processing instead of being controlled by the control unit 101.

The ROM 102 is an electrically erasable/recordable non-volatile memory, and the below-described program executed by the control unit 101 is stored therein.

A random access memory (RAM) 103 is a volatile memory used as a work memory for the control unit 101 to execute a program or a temporary storage area of various types of data.

A recording medium 104 is a medium used for recording. For example, the recording medium 104 is configured of a memory card, a flash memory, or a hard disk. The recording medium 104 may be attachable to and detachable from the smart-speaker 100, or may be built into the smart-speaker 100. Therefore, the smart-speaker 100 just has to include at least a unit for accessing the recording medium 104.

An operation unit 105 is a processing unit for receiving a user operation and notifying received information to the control unit 101. For example, the operation unit 105 is configured of a touch panel, a button switch, and a cross key. The operation unit 105 further includes a power switch which allows the user to input an instruction for turning on or off the power of the smart-speaker 100.

A display unit 106 is a processing unit for displaying image data and an operation state of the device. The display unit 106 is configured of a liquid crystal panel or a light-emitting diode (LED) panel. In addition, the smart-speaker 100 does not always have to include the display unit 106. The smart-speaker 100 just has to be connectable to the display unit 106 and include at least a display control function for controlling display of the display unit 106.

A voice receiving unit 107 is a processing unit which converts user's voice into digital data and stores the digital data in the RAM 103. For example, the voice receiving unit 107 includes a microphone.

A voice output unit 108 is a processing unit which converts the data stored in the RAM 103 to voice and outputs the voice to an external portion through a speaker.

A wireless LAN communication unit 109 is a processing unit for executing wireless communication compliant with the Institute of Electrical and Electronics Engineers (IEEE) 802.11 standard. The wireless LAN communication unit 109 operates as a station (STA) of the wireless LAN to execute wireless communication by connecting to the wireless LAN network formed by the wireless LAN router 300.

A BT communication unit 110 is a processing unit for executing wireless communication compliant with the Bluetooth® standard. In the present exemplary embodiment, a Bluetooth® Low Energy (hereinafter, referred to as "BLE") mode specified in the Bluetooth® version 4.0 or later is employed for Bluetooth® communication (BT communication). A communicable range of the BLE communication is narrower (i.e., a communicable distance thereof is shorter) than that of the wireless LAN communication, and a communication speed thereof is slower than that of the wireless LAN communication. On the other hand, power consumption of the BLE communication is lower than that of the wireless LAN communication. In the present exemplary embodiment, the BT communication unit 110 operates as "central", and executes wireless data communication with the digital camera 200.

An internal bus 120 mutually connects the respective processing units.

Herein, a role of a communication device in the BLE communication will be described. Two communication devices connected through the BLE communication respectively operate as "central" and "peripheral". A connection mode of the BLE communication standard is a master-slave star network. A communication device operating as "central" (hereinafter, referred to as "central device") functions as a master, whereas a communication device operating as "peripheral" (hereinafter, referred to as "peripheral device")

functions as a slave. The central device manages participation of the peripheral device to the network and executes setting of various parameters for wirelessly connecting to the peripheral device. Although the central device can concurrently connect to a plurality of peripheral devices, the peripheral device cannot establish wireless connection with more than one central device at a time. Further, wireless connection cannot be established between devices serving as central devices, so that one device should serve as a central device whereas another device should serve as a peripheral when wireless connection is to be established. A role of the communication device in BLE communication has been described as the above.

In the present exemplary embodiment, a communication speed of communication realized by the wireless LAN communication unit 109 is faster than a communication speed of communication realized by the BT communication unit 110. Further, a communicable range of communication realized by the wireless LAN communication unit 109 is wider than that of communication realized by the BT communication unit 110.

Herein, the smart-speaker 100 constantly receives power from an external power supply such as a commercial power supply.

<Configuration Example of Digital Camera 200>

Figure 3:
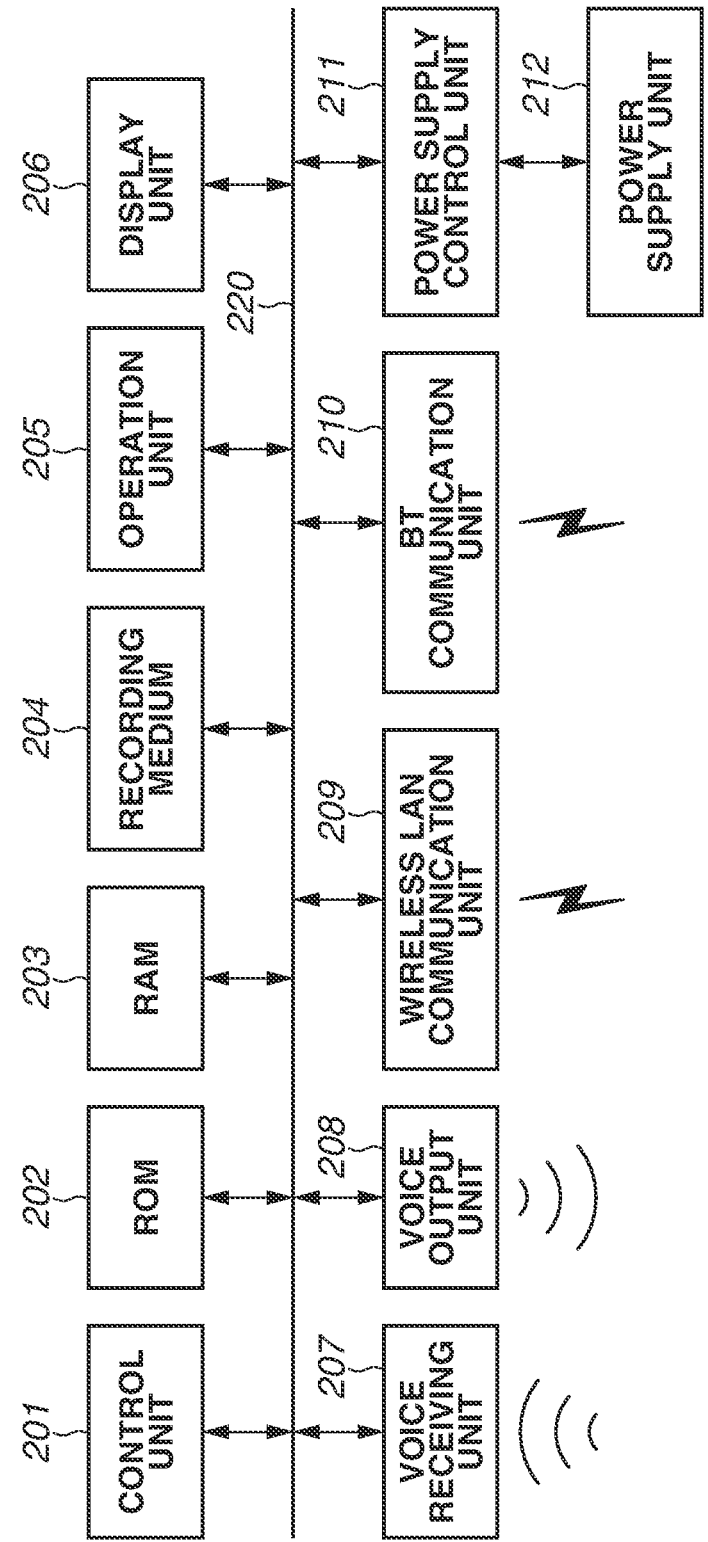
FIG. 3 is a block diagram illustrating an example of a configuration of a digital camera according to the first exemplary embodiment.

FIG. 3 is a block diagram illustrating an example of a configuration of the digital camera 200.

A control unit 201 controls respective units of the digital camera 200 according to an input signal or a program stored in a ROM 202. For example, the control unit 201 is configured of one or more processors such as CPUs or MPUs. In addition, the entirety of the device may be controlled by a plurality of pieces of hardware by sharing the processing instead of being controlled by the control unit 201.

The ROM 202 is an electrically erasable/recordable non-volatile memory, and the below-described program executed by the control unit 201 is stored therein.

A RAM 203 is a volatile memory, and serves as a work memory which the control unit 201 uses to execute a program, or a temporary storage area of various types of data.

A recording medium 204 is a medium used for recording. For example, the recording medium 204 is configured of a memory card, a flash memory, or a hard disk. The recording medium 204 may be attachable to and detachable from the digital camera 200, or may be built into the digital camera 200. In other words, the digital camera 200 just has to include at least a unit for accessing the recording medium 204.

An operation unit 205 is a processing unit for receiving a user operation and notifying received information to the control unit 201. For example, the operation unit 205 is configured of a touch panel, a button switch, and a cross key. The operation unit 205 further includes a power switch which allows the user to input an instruction for turning on or off the power of the digital camera 200.

A display unit 206 is a processing unit for displaying image data and an operation state of the device. The display unit 206 is configured of a liquid crystal panel or an LED panel. In addition, the digital camera 200 does not always have to include the display unit 206. The digital camera 200 just has to be connectable to the display unit 206 and include at least a display control function for controlling display of the display unit 206.

A voice receiving unit 207 is a processing unit which converts user's voice into digital data and stores the digital data in the RAM 203. For example, the voice receiving unit 207 detects user's voice via a microphone.

A voice output unit 208 is a processing unit which converts the data stored in the RAM 203 to voice and outputs the voice to an external portion through a speaker.

A wireless LAN communication unit 209 is a processing unit for executing wireless communication compliant with the IEEE 802.11 standard. The wireless LAN communication unit 209 operates as a station (STA) of the wireless LAN to execute wireless communication by connecting to the wireless LAN network formed by the wireless LAN router 300.

A BT communication unit 210 is a processing unit for executing wireless communication compliant with the Bluetooth® standard. BT communication unit 210 operates as "peripheral", and executes BLE communication with the smart-speaker 100.

A power supply control unit 211 is a processing unit for controlling power to be supplied to respective processing units from a power supply unit 212.

The power supply unit 212 can supply power to respective elements of the digital camera 200. For example, the power supply unit 212 is a lithium ion cell or battery.

An internal bus 220 mutually connects the respective processing units.

Herein, power control of the digital camera 200 executed by the power supply control unit 211 will be described with reference to FIG. 4. As described above, the digital camera 200 is a device driven by a battery, and includes the power supply control unit 211 in order to realize low power consumption.

FIG. 4 is a table illustrating an example of a power supply state of the digital camera 200. In a power supply state PS0, power is not supplied to any of the processing units of the digital camera 200, so that the power switch of the digital camera 200 is turned off. In a power supply state PS1, the power supply control unit 211 does not distribute power to the voice receiving unit 207, the voice output unit 208, and the wireless LAN communication unit 209. The power supply state PS1 is a state where power consumption is suppressed next to the power supply state PS0. In a power supply state PS2, power is supplied to at least all of the units illustrated in FIG. 3. The digital camera 200 is shifted to the power supply state PS2 from the power supply state PS0 when the power switch is turned on by a user operation. The digital camera 200 is shifted to the power supply state PS0 from the power supply state PS2 or PS1 when the power switch is turned off by a user operation. Further, when the power supply control unit 211 receives an instruction from the control unit 201, the digital camera 200 is shifted to the power supply state PS2 from the power supply state PS1, or shifted to the power supply state PS1 from the power supply state PS2. For example, in the power supply state PS1, if a request packet for enabling the voice control function is received from the smart-speaker 100 via the BT communication unit 210, the control unit 201 instructs the power supply control unit 211 to shift the power supply state to the power supply state PS2. The power control unit receives the instruction and supplies power to the voice receiving unit 207, the voice output unit 208, and the wireless LAN communication unit 209. On the other hand, if the control unit 201 instructs the power supply control unit 211 to shift the power supply state PS2 to the power supply state PS1, the power supply control unit 211 stops supplying power to the voice receiving unit 207, the voice output unit 208, and the wireless LAN communication unit 209.

<Processing Sequence for Setting Remote Control Function of Smart-Speaker 100>

FIG. 5 is a sequence diagram illustrating an example of processing for setting a remote control function of the smart-speaker 100. Details of the remote control function will be described below with reference to FIGS. 9 and 10. By executing the processing, the smart-speaker 100 can receive user's voice that should be input to the digital camera 200 in place of the digital camera 200. Further, if the smart-speaker 100 transmits voice data of the received voice to the digital camera 200 after the voice control function of the digital camera 200 is turned on, the digital camera 200 can execute processing based on the voice data.

This processing is executed when the user operates an application for setting the smart-speaker 100 on the smartphone 500. This application is installed in the smartphone 500. The smartphone 500 communicates with the smart-speaker 100 and the digital camera 200 through wireless LAN communication according to the user operation to execute the above-described processing.

In addition, the smartphone 500, the smart-speaker 100, and the digital camera. 200 are connected to the same wireless LAN network. Further, the smartphone 500 has detected the smart-speaker 100 and the digital camera 200 in the wireless LAN network and is accessible to the respective devices 100 and 200.

In step S501, the smartphone 500 transmits a message for requesting acquisition of information about the digital camera 200 to the digital camera 200 via wireless LAN communication. For example, the information about the digital camera includes a device name of the digital camera 200, a wake word, and a Bluetooth® device (BD) address. Herein, the device name is a character string which the user has set as a name of the digital camera 200. The wake word is a word for executing the voice control function of the digital camera 200. The BD address is 48-bit address information used for identifying a device as a communication partner in the BLE communication. This BD address is different for each device.

In step S502, in response to the message received in step S501, the digital camera 200 transmits the information about the digital camera 200 to the smartphone 500 via wireless LAN communication.

In step S503, the smartphone 500 transmits a message for requesting the smart-speaker 100 to start setting the remote control function to the smart-speaker 100 via wireless LAN communication. In step S503, the smartphone 500 transmits the information about the device name, the wake word, and the BD address of the digital camera 200 received in step S502 to the smart-speaker 100.

In step S504, the smart-speaker 100 registers the information about the digital camera 200 received in step S503 in a device management database (DB). The device management DB is database information for managing the information about a device name, a wake word, a BD address, and an operation state of a voice control function for each device. The device management DB is stored in the ROM 202. Herein, FIG. 6A is a table illustrating the device management DB after the processing in step S504 is ended. An identification (ID) 1 represents information about the smart-speaker 100, and an ID 2 represents information about the digital camera 200. In step S504, the information about the digital camera 200 is registered.

In step S505, the smart-speaker 100 establishes connection for BLE communication with the digital camera 200. Specifically, with respect to an advertisement message periodically transmitted from the digital camera 200 serving as a peripheral device, the BT communication unit 210 of the smart-speaker 100 transmits a message for requesting connection of BLE communication to establish the connection of BLE communication.

In step S506, the smart-speaker 100 detects a state notification service provided by the digital camera 200 via the BLE communication through an attribute (ATT) protocol. The state notification service is a service for periodically notifying a communication partner about whether an operation state of the voice control function is ON or OFF.

In step S507, the smart-speaker 100 requests the digital camera 200 to start providing the state notification service detected in step S506 via BLE communication.

In step S508, the digital camera 200 starts providing the state notification service to the smart-speaker 100.

In step S509, the digital camera 200 transmits a notification indicating start of the state notification service to the smart-speaker 100 via BLE communication.

In step S510, the smart-speaker 100 transmits a notification indicating completion of setting of the remote control function to the smartphone 500 via wireless LAN communication.

The processing sequence for setting the remote control function of the smart-speaker 100 has been described with reference to FIG. 5.

In the present exemplary embodiment, the application for executing the processing for setting the remote control function to the smart-speaker 100 is installed in the smartphone 500. However, the application does not always have to be installed in the smartphone 500. For example, in a state where the smart-speaker 100 executes a Web application, the user may execute the processing via a Web client function (e.g., Web browser) of the smartphone 500 by using a Web application programming interface (API).

Further, in the present exemplary embodiment, the user executes the processing of the smart-speaker 100 by using the smartphone 500. However, the user may make the smart-speaker 100 execute the above-described processing by using the digital camera 200. For example, the user installs the application for executing the processing in the digital camera 200, and makes the smart-speaker 100 execute the processing by using the digital camera 200.

<Processing Sequence for Acquiring Information about Operation State of Voice Control Function>

Figure 8:
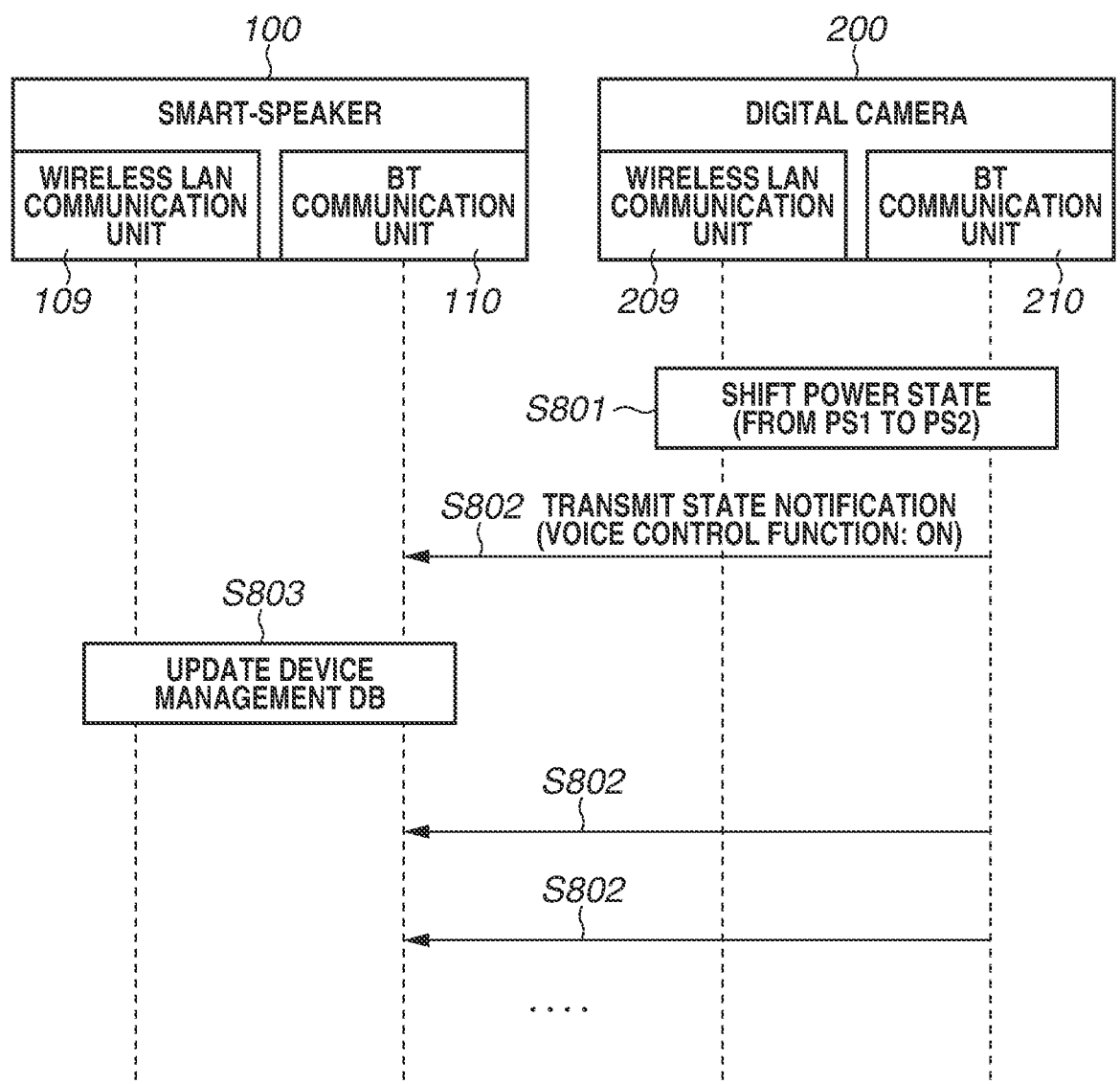
FIG. 8 is a sequence diagram illustrating an example of processing which allows the smart-speaker according to the first exemplary embodiment in a power supply state PS1, to acquire information about an operation state of the voice control function of the digital camera.

FIGS. 7 and 8 are sequence diagrams illustrating examples of processing which allows the smart-speaker 100 to acquire information about an operation state of the voice control function of the digital camera 200.

The digital camera 200 periodically transmits information indicating the operation state of the voice control function to the smart-speaker 100 via BLE communication. For example, the digital camera 200 transmits the information indicating the operation state of the voice control function to the smart-speaker 100 at an interval of 100 milliseconds. Based on the information received from the digital camera 200, the smart-speaker 100 updates the operation state of the voice control function of the digital camera 200 registered in the device management DB.

The operation of the digital camera 200 in this sequence diagram corresponds to the state notification service described in FIG. 5. FIGS. 7 and 8 are sequence diagrams respectively illustrating processing to be executed if the voice control function is ON or OFF when the digital camera 200 is executing the state notification service.

First, FIG. 7 will be described. This processing is executed when the power of the digital camera 200 is ON.

FIG. 7 is a sequence diagram of the processing executed when the digital camera 200 is in the power supply state PS2.

In step S701, the digital camera 200 changes the voice control function to the OFF state from the ON state. At this time, the power supply state of the digital camera 200 is shifted to the power supply state PS1 from the power supply state PS2. The processing of step S701 is executed when the user does not operate the digital camera 200 for a predetermined period of time, or when the user manually disables the voice control function via the operation unit 205.

In step S702, the digital camera 200 transmits a state notification message indicating the OFF state of the voice control function to the smart-speaker 100 via BLE communication. The digital camera 200 transmits the state notification message periodically and repeatedly even after step S702.

In step S703, the smart-speaker 100 changes the operation state of the voice control function of the digital camera 200 registered in the device management DB to "OFF". Through the processing in step S703, the device management DB is updated to a state illustrated in FIG. 6B.

Next, FIG. 8 will be described. FIG. 8 is a sequence diagram of the processing executed when the digital camera 200 is in the power supply state PS1.

In step S801, the digital camera 200 changes the voice control function to the ON state from the OFF state. At this time, the power supply state of the digital camera 200 is shifted to the power supply state PS2 from the power supply state PS1. The processing of step S701 is executed, for example, when the user manually enables the voice control function via the operation unit 205.

In step S802, the digital camera 200 transmits a state notification message indicating the ON state of the voice control function to the smart-speaker 100 via BLE communication. The digital camera 200 further transmits the state notification message periodically and repeatedly even after step S802.

In step S803, the smart-speaker 100 changes the operation state of the voice control function of the digital camera 200 registered in the device management DB to "ON". Through the processing in step S803, the device management DB is updated to a state illustrated in FIG. 6C.

The processing sequence which allows the smart-speaker 100 to acquire information about the operation state of the voice control function of the digital camera 200 has been described with reference to FIGS. 7 and 8.

<Processing Sequence of Remote Control Function of Smart-Speaker 100>

Figure 9:
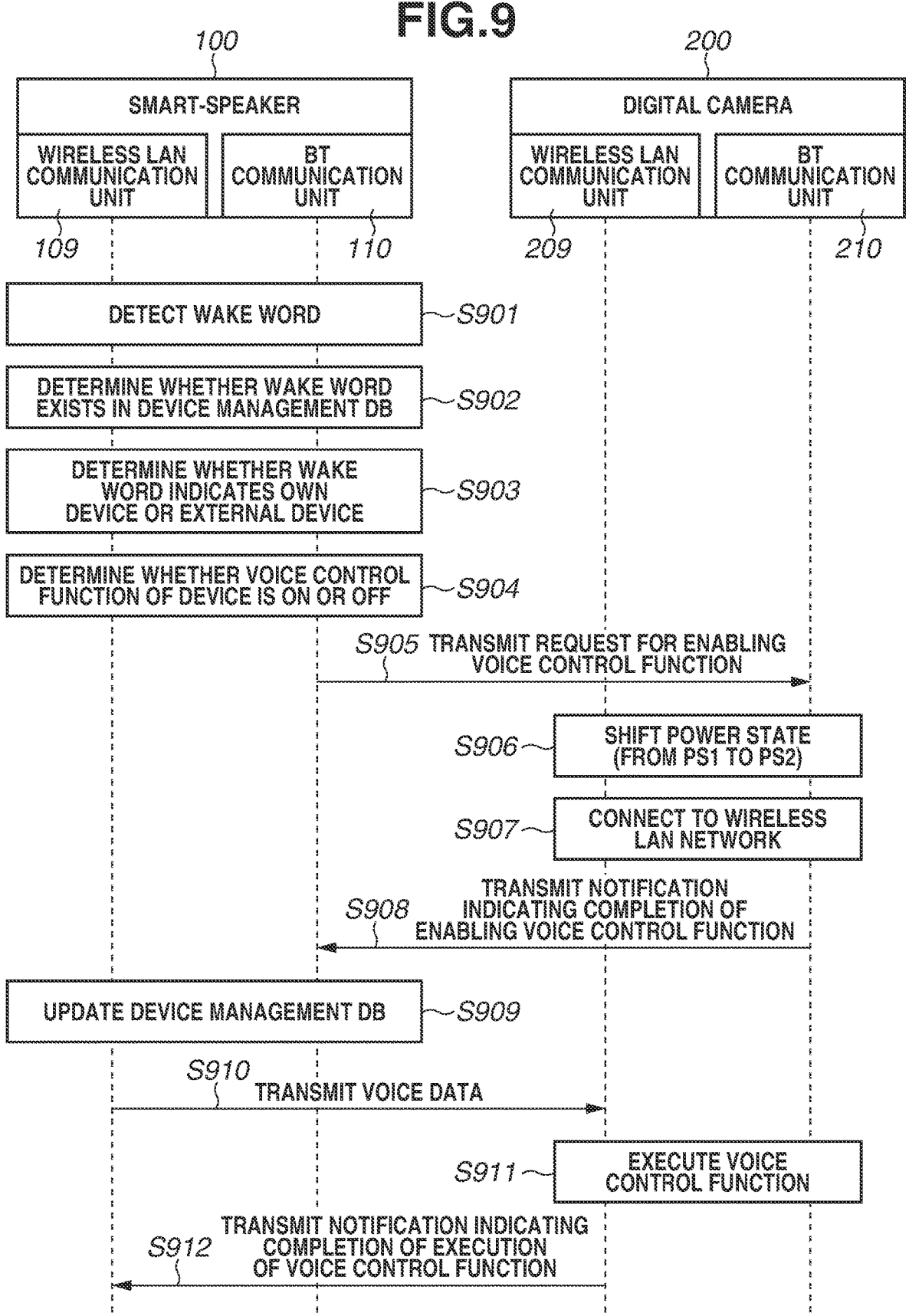
FIG. 9 is a sequence diagram illustrating an example of processing of a remote control function executed when the voice control function of the digital camera according to the first exemplary embodiment is OFF.
Figure 10:
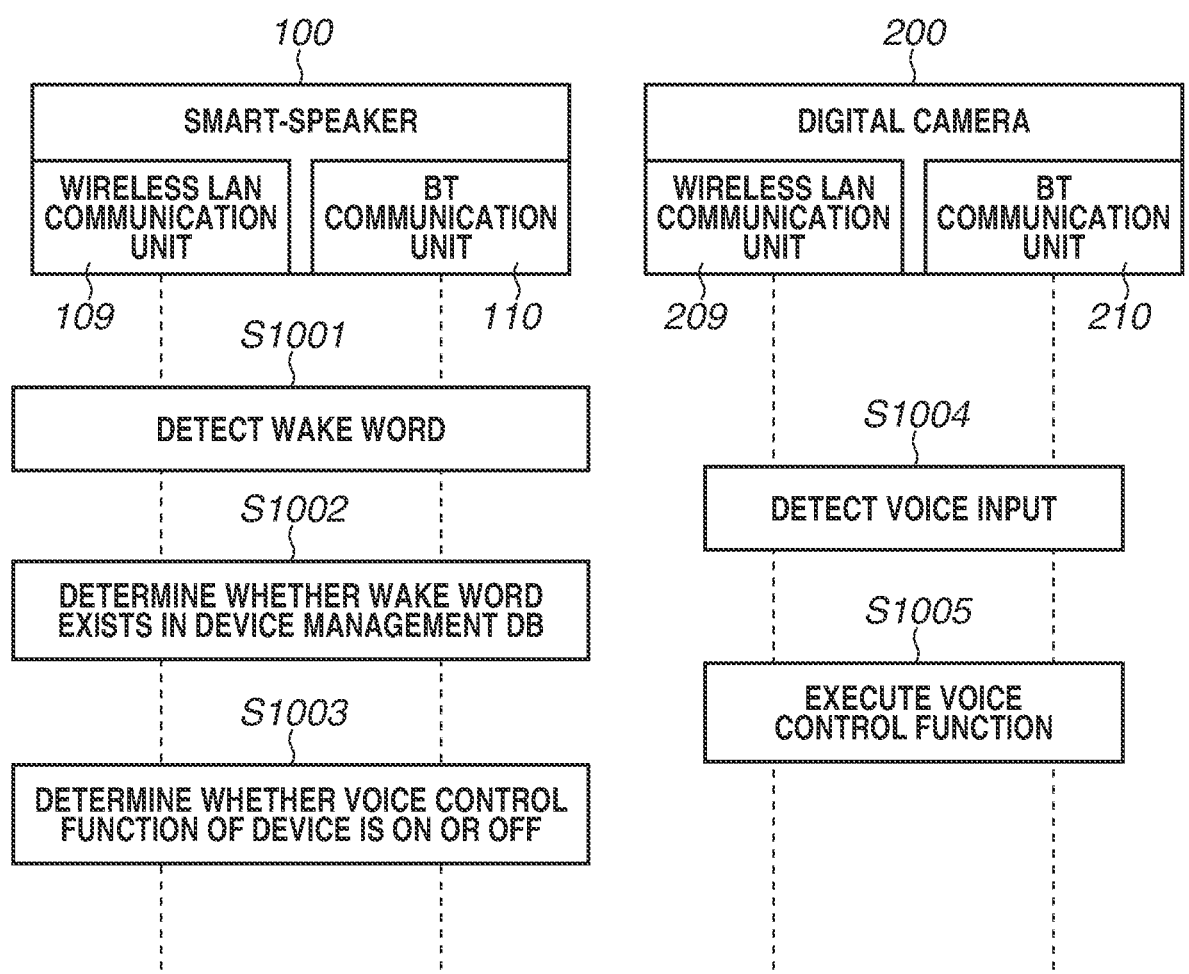

FIGS. 9 and 10 are sequence diagrams illustrating examples of processing of a remote control function of the smart-speaker 100. The sequence diagram in FIG. 9 illustrates an example of processing to be executed if the user speaks to the digital camera 200 when the voice control function of the digital camera 200 is OFF. The sequence diagram in FIG. 10 illustrates an example of processing to be executed if the user speaks to the digital camera 200 when the voice control function of the digital camera 200 is ON. In addition, the processing for setting the remote control function of the smart-speaker 100 described with reference to FIG. 5 has been executed before the processing in FIG. 9 or 10 is executed.

First, FIG. 9 will be described. When the processing is to be started, the voice control function of the digital camera 200 is OFF, and the power supply state is the power supply state PS1. Further, a state of the device management DB of the smart-speaker 100 is the state illustrated in FIG. 6B.

This processing sequence is started, for example, when the user speaks to the digital camera 200, "Hey, Thomas, show me the photo taken last time." At this time, it is assumed that the user exists within a range where the user's voice can sufficiently reach the smart-speaker 100 and the digital camera 200.

In step S901, the smart-speaker 100 detects a wake word included in a received voice input. For example, the smart-speaker 100 detects a wake word "Thomas" from the received voice input. The smart-speaker 100 stores the voice data of the voice input in the RAM 203.

In step S902, the smart-speaker 100 refers to the device management DB and determines whether an entry corresponding to the wake word detected in step S901 exists. The smart-speaker 100 determines, for example, whether an entry corresponding to the wake word "Thomas" exists. If the entry corresponding to the detected wake word does not exist, the smart-speaker 100 ends the processing. If the entry corresponding to the detected wake word exists, the smart-speaker 100 advances the processing to step S903.

In step S903, the smart-speaker 100 determines whether a device corresponding to the wake word detected in step S901 is the own device (smart-speaker 100) or an external device. If the smart-speaker 100 determines that the own device corresponds thereto, the smart-speaker 100 uses the own voice control function to analyze the received voice input and executes processing corresponding to that voice input. If the smart-speaker 100 determines that the external device corresponds thereto, the processing proceeds to step S904.

In step S904, the smart-speaker 100 determines whether the operation state of the voice control function of the external device is ON or OFF. In the processing, because the device management DB is in the state illustrated in FIG. 6B, the smart-speaker 100 determines that the ID2 (digital camera) corresponds to the wake word "Thomas", and determines that the operation state of the voice control function is OFF.

In step S905, the smart-speaker 100 transmits a message for requesting the digital camera 200 to enable the voice control function, to the digital camera 200 via BLE communication. The smart-speaker 100 transmits information about a service set identifier (SSID) and a cryptography key as the information necessary for connecting to the wireless LAN network to which the smart-speaker 100 is connected together with this message. The digital camera 200 receives the message and starts processing for enabling the voice control function. This wireless LAN network is the wireless LAN network formed by the wireless LAN router 300 illustrated in FIG. 1.

In step S906, the digital camera 200 shifts the power supply state to the power supply state PS2 from the power supply state PS1.

In step S907, the digital camera 200 connects to the wireless LAN network by using the information about the SSID and the cryptography key received in step S905. Further, the digital camera 200 detects the server 400 via the wireless LAN network and brings the voice control function into a usable state.

In step S908, the digital camera 200 transmits a message notifying completion of the request received in step S905 to the smart-speaker 100 via BLE communication. In addition to the information about the completion notification, the message also includes information indicating the ON state of the voice control function of the digital camera 200 and the information such as an internet protocol (IP) address of the digital camera 200 necessary for accessing the digital camera 200 via the wireless LAN communication.

In step S909, the smart-speaker 100 changes the operation state of the voice control function of the ID2 (digital camera 200) registered in the device management DB to "ON". Through the processing in step S909, the device management DB is brought into a state illustrated in FIG. 6C.

In step S910, the smart-speaker 100 transmits a message requesting the digital camera 200 to execute the voice control function corresponding to the voice input detected in step S901 to the digital camera 200 via wireless LAN communication. This message includes the data of the voice input received by the smart-speaker 100 in step S901.

In step S911, the digital camera 200 executes the voice control function according to the message received in step S910. Specifically, by using the server 400, the digital camera 200 interprets a portion of the voice data, "Show me the photo taken last time", received in step S910 to determine necessary processing. The digital camera 200 displays a last still image data recorded in the recording medium 204 on the display unit 206, and outputs a voice message, "Here, please see the photo", in response to the user's request.

In step S912, the digital camera 200 transmits a message indicating completion of the processing requested in the message received in step S910 to the smart-speaker 100 via wireless LAN communication.

The processing in steps S901 to S911 corresponds to the procedures of the voice control function executed with respect to the user's voice input, "Hey, Thomas, show me the photo taken last time."

Subsequently, FIG. 10 will be described. When the processing is to be started, the voice control function of the digital camera 200 is ON, and the power supply state is the power supply state PS2. Further, the device management DB of the smart-speaker 100 is in the state illustrated in FIG. 6C. For example, this processing sequence is started when the user speaks, "Hey, Thomas, show me the last but one photo", to the digital camera 200 after the processing in FIG. 9.

In step S1001, the smart-speaker 100 detects a wake word from the received user's voice input. For example, the smart-speaker 100 detects a wake word "Thomas" from the received voice input.

In step S1002, the smart-speaker 100 refers to the device management DB and determines whether an entry corresponding to the wake word detected in step S1001 exists. For example, the smart-speaker 100 determines whether an entry corresponding to the wake word "Thomas" exists. If the entry corresponding to the detected wake word does not exist, the smart-speaker 100 ends the processing.

If the smart-speaker 100 determines that the corresponding entry exists in step S1002, in step S1003, the smart-speaker 100 determines whether the operation state of the voice control function of the device corresponding to the wake word is ON or OFF. In step S1003, for example, because the device management DB is in the state illustrated in FIG. 6C, the smart-speaker 100 determines that the ID2 (digital camera 200) corresponds to the wake word "Thomas", and determines that the operation state of the voice control function is ON. In this case, the smart-speaker 100 does not have to remotely control the digital camera 200. Therefore, the smart-speaker 100 ends the processing.

In step S1004, the digital camera 200 detects a voice input via the voice receiving unit 207. For the sake of convenience, a step number "S1004" is applied to the above processing. However, the processing is executed independently from the processing executed by the smart-speaker 100 when the user speaks to the digital camera 200.

In step S1005, the digital camera 200 executes the voice control function according to the voice input received in step S1004. For example, the digital camera 200 determines a portion of the voice data, "Show me the last but one photo", received in step S1004 to determine necessary processing, and displays still image data that is recorded second-last on the display unit 206. The digital camera 200 further outputs a voice message, "Here, please see the photo", in response to the user's voice input.

The processing sequence of the remote control function of the smart-speaker 100 has been described with reference to FIGS. 9 and 10.

As a method of executing the voice control function corresponding to the voice input received in step S901, a method of transmitting voice data from the smart-speaker 100 to the digital camera 200 via wireless LAN communication has been described. However, another method can be also used.

As another method, a method using a Web API can be carried out. In a case where the Web API function which enables the smart-speaker 100 to remotely control various functions of the digital camera 200 via the network is provided, the smart-speaker 100 analyzes the voice input received in step S901. With this configuration, the voice data can be converted into the Web API through the server, and the smart-speaker 100 may execute the converted Web API with respect to the digital camera 200. In addition, a function for converting the voice data into the Web API may be provided by the server on the Internet so that the smart-speaker 100 uses that server.

Furthermore, as another exemplary embodiment, the smart-speaker 100 may output voice data received in step S901 via the voice output unit 108 in place of the user.

<Processing Sequence of Remote Control Function of Smart-Speaker 100>

Figure 11:
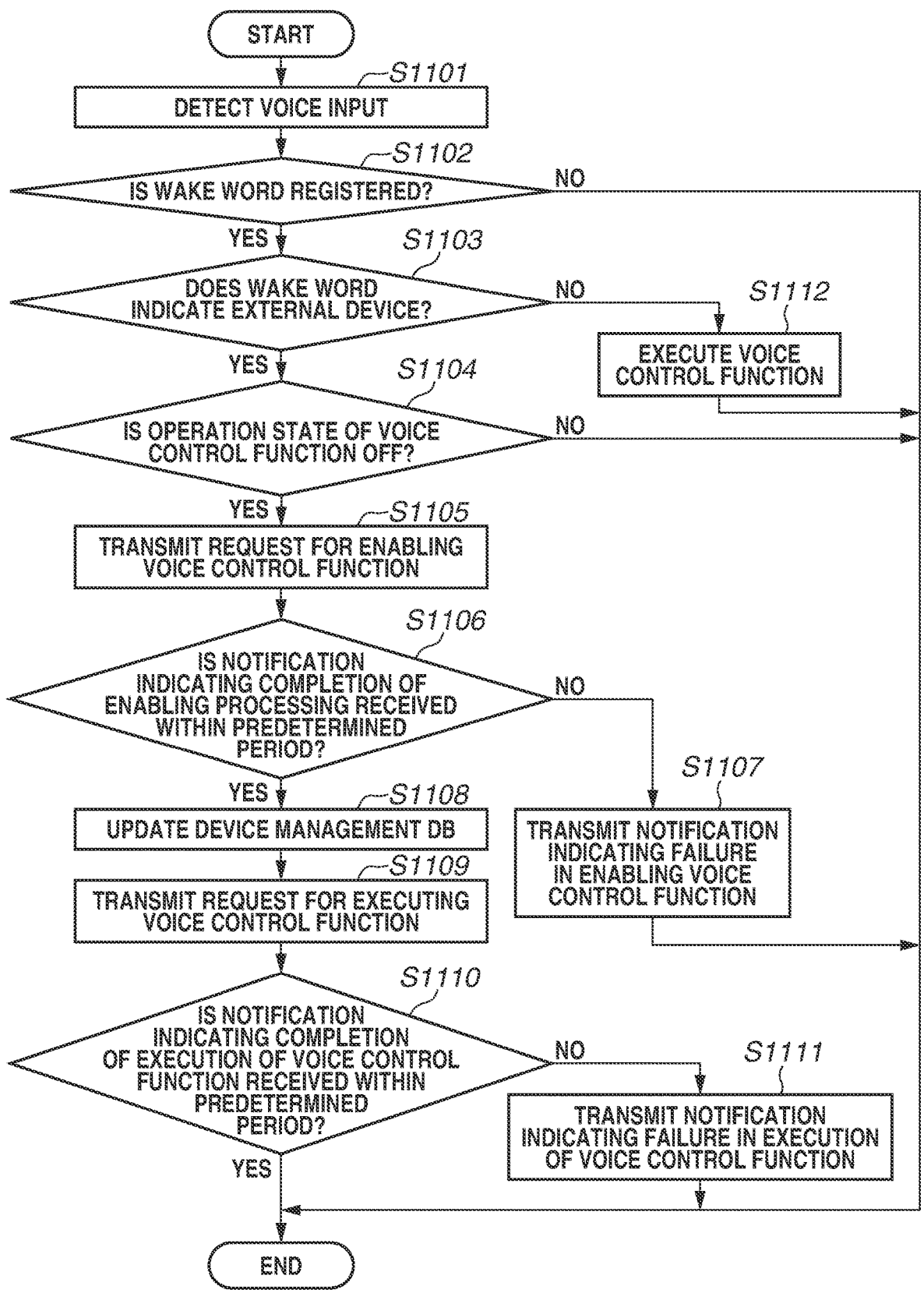
FIG. 11 is a flowchart illustrating an example of processing of the remote control function of the smart-speaker according to the first exemplary embodiment.

FIG. 11 is a flowchart illustrating an example of processing of the remote control function of the smart-speaker 100.

In step S1101, the control unit 101 detects a wake word included in the voice input received by the voice receiving unit 107. The control unit 101 stores voice data of the received voice input in the RAM 203. This processing corresponds to the processing in step S901 of FIG. 9.

In step S1102, the control unit 101 determines whether the wake word detected in step S1101 is registered in the device management DB stored in the ROM 202. If the control unit 101 determines that the wake word is registered (YES in step S1102), the processing proceeds to step S1103. If the control unit 101 determines that the wake word is not registered (NO in step S1102), the processing is ended. The processing in step S1102 corresponds to the processing in step S902 of FIG. 9.

In step S1103, the control unit 101 identifies a device that corresponds to the wake word determined to be registered in the device management DB in step S1102, and determines whether that device is an external device. If the control unit 101 determines that the device is the external device (i.e., digital camera 200) (YES in step S1103), the processing proceeds to step S1104. If the control unit 101 determines that the device is the own device (NO in step S1103), the processing proceeds to step S1112. This processing in step S1103 corresponds to the processing in step S903 of FIG. 9.

In step S1104, the control unit 101 determines whether the operation state of the voice control function of the digital camera 200 identified in step S1103 is ON or OFF. If the control unit 101 determines that the operation state of the voice control function is OFF (OFF in step S1104), the processing proceeds to step S1105. If the control unit 101 determines that the operation state of the voice control function is ON (ON in step S1104), the processing is ended. This processing in step S1104 corresponds to the processing in step S904 of FIG. 9.

In step S1105, the control unit 101 transmits a message requesting the digital camera 200 to enable the voice control function through the BT communication unit 110. This processing in step S1105 corresponds to the processing in step S905 of FIG. 9.

In step S1106, the control unit 101 determines whether a notification of completion is received from the digital camera 200 within a predetermined period in response to the message transmitted in step S1105. If the notification is received from the digital camera 200 within a predetermined period (YES in step S1106), the processing proceeds to step S1108. If the notification is not received from the digital camera 200 within a predetermined period (NO in step S1106), the processing proceeds to step S1107. This processing in step S1106 corresponds to the processing in step S908 of FIG. 9.

In step S1107, the control unit 101 notifies the user that the voice control function of the digital camera 200 cannot be enabled and ends the processing. As an error processing, for example, a message such as "Digital camera 200 is not communicable" or "Digital camera 200 is not found in the vicinity" is notified to the user through the voice output unit 108 or the display unit 106.

In step S1108, the control unit 101 updates the device management DB. The control unit 101 changes the operation state of the voice control function of the digital camera 200 to "ON". This processing in step S1108 corresponds to the processing in step S909 of FIG. 9.

In step S1109, the control unit 101 transmits a message requesting the digital camera 200 to execute the voice control function corresponding to the voice input received in step S1101 to the digital camera 200 via the wireless LAN communication unit 109. This processing in step S1109 corresponds to the processing in step S910 of FIG. 9.

In step S1110, the control unit 101 determines whether a notification of the completion is received from the digital camera 200 within a predetermined period. If the completion notification is received within a predetermined period (YES in step S1110), the processing is ended. If the completion notification cannot be received from the digital camera 200 even if a predetermined time has passed or an error response is received (NO in step S1110), the processing proceeds to step S1111. This processing in step S1110 corresponds to the processing in step S912 of FIG. 9.

In step S1111, the control unit 101 notifies the user that the instruction provided by the user's voice is not executed by the digital camera 200, and ends the processing. In the error processing, for example, a message such as "Digital camera 200 is not communicable", "Digital camera 200 is not found in the vicinity", or "Please speak again" is notified to the user through the voice output unit 108 or the display unit 106.

In step S1112, the control unit 101 executes the voice control function corresponding to the voice input received in step S1101. Specifically, the control unit determines a command based on the received voice input by using the server 400 via the wireless LAN communication unit 209, and executes the processing instructed by the voice input.

A processing sequence of the remote control function of the smart-speaker 100 has been described as the above.

<Processing Sequence of Remote Control Function of Digital Camera 200>

Figure 12:
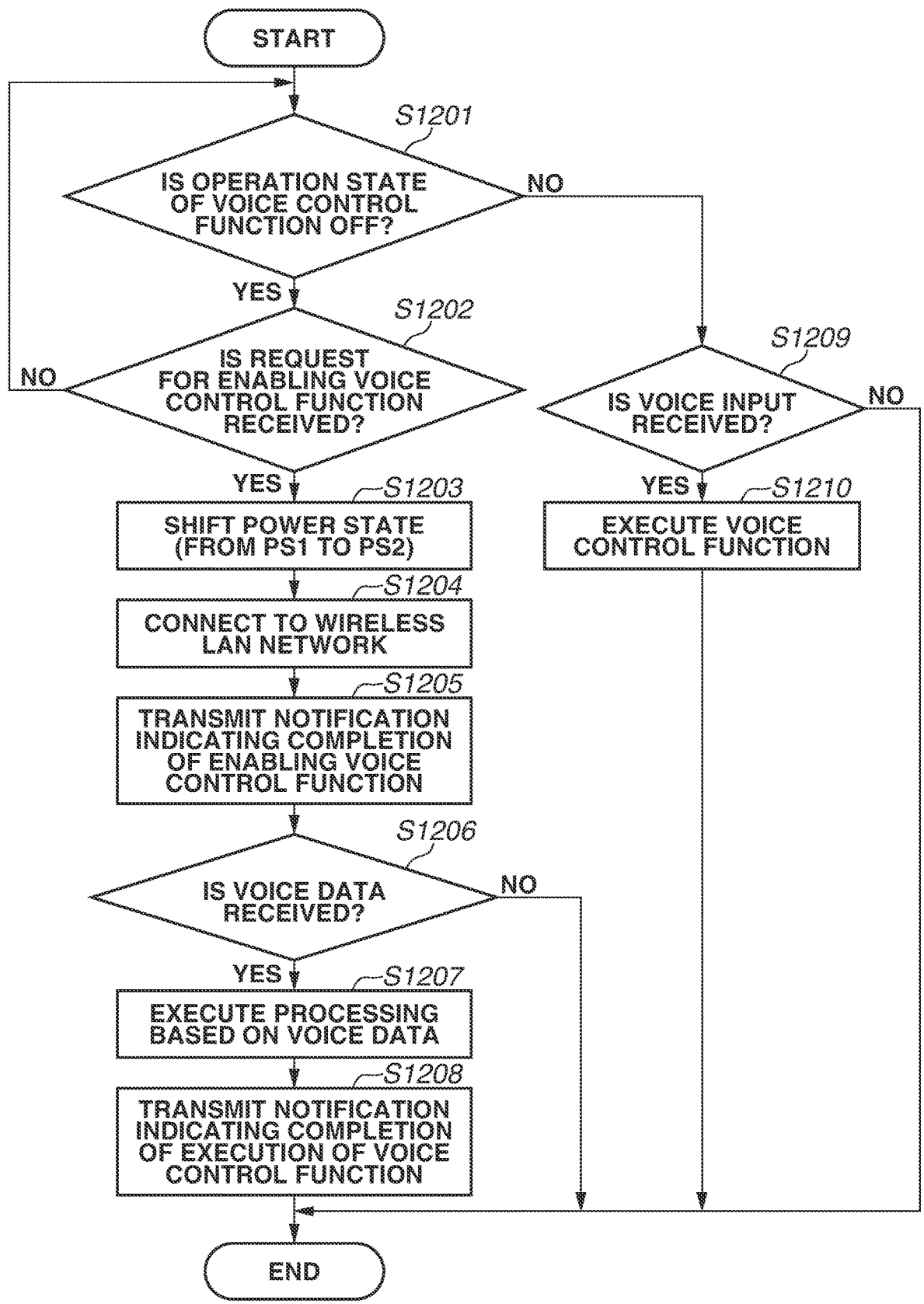
FIG. 12 is a flowchart illustrating an example of processing of the remote control function of the digital camera according to the first exemplary embodiment.

FIG. 12 is a flowchart illustrating an example of processing of the remote control function of the digital camera 200. This flowchart is started when the digital camera 200 is activated.

In step S1201, the control unit 201 determines whether the voice control function is ON or OFF. If the voice control function is ON (ON in step S1201), the processing proceeds to step S1209. If the voice control function is OFF (OFF in step S1201), the processing proceeds to step S1202.

In step S1202, the control unit 201 determines whether a message requesting the digital camera 200 to enable the voice control function is received from the smart-speaker 100 via the BT communication unit 210. If the message is received (YES in step S1202), the processing proceeds to step S1203. If the message is not received (NO in step S1202), the processing returns to step S1201, and the control unit 201 determines the operation state of the voice control function.

In step S1203, the control unit 201 controls the power supply control unit 211 to shift the power supply state to the power supply state PS2 from the power supply state PS1.

In step S1204, the control unit 201 uses the SSID and the cryptography key included in the message received in step S1202 to connect to the wireless LAN network via the wireless LAN communication unit 209. Further, the control unit 201 detects the server 400 via the wireless LAN communication unit 209 and brings the voice control function into a usable state.

In step S1205, the control unit 201 transmits a completion notification indicating the enabled state of the voice control function to the smart-speaker 100 via the BT communication unit 210.

In step S1206, the control unit 201 determines whether voice data is received from the smart-speaker 100 via the wireless LAN communication unit 209. If the voice data is not received (NO in step S1206), the control unit 201 ends the processing and stands ready in a state where the voice control function is enabled. If the voice data is received (YES in step S1206), the processing proceeds to step S1207.

In step S1207, the control unit 201 analyzes the received voice data and executes processing based on the analysis result.

In step S1208, the control unit 201 transmits a message indicating that the processing has been completed based on the received voice data to the smart-speaker 100 via the wireless LAN communication unit 209.

The processing to be executed when the voice control function of the digital camera 200 is OFF has been described. Next, the processing will be described with respect to the case where the control unit 201 determines that the voice control function is ON in step S1201.

In step S1209, the control unit 201 determines whether a voice input is received. If the voice input is received (YES in step S1209), the processing proceeds to step S1210. If the voice input is not received (NO in step S1209), the control unit 201 ends the processing and stands ready until an instruction is given by the user.

In step S1210, the control unit 201 executes the voice control function based on the received voice input. The control unit 201 analyzes voice data of the received voice input and executes processing based on the analysis result.

A processing sequence of the remote control function of the digital camera 200 has been described.

In the above-described exemplary embodiment, in place of the digital camera 200, the smart-speaker 100 can receive the voice input even when the voice control function of the digital camera 200 is OFF, so that the user can use the voice control function. Further, through the above-described configuration, the user can use the voice control function while reducing the power consumption of the digital camera 200.

The present disclosure can be realized in such a manner that a program for realizing one or more functions according to the above-described exemplary embodiments is supplied to a system or an apparatus via a network or a storage medium, so that one or more processors in the system or the apparatus read and execute the program. Further, the present disclosure can be also realized with a circuit (e.g., application specific integrated circuit (ASIC)) that realizes one or more functions.

Further, the present disclosure is not limited to the above-described exemplary embodiments. Therefore, in the implementation phase, the present disclosure can be embodied by modifying the constituent element within a range which does not depart from the technical spirit thereof. Further, various embodiments can be achieved by appropriately combining the plurality of constituent elements described in the above exemplary embodiments. For example, some of the constituent elements may be deleted from all the constituent elements described in the above-described exemplary embodiments.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-205868, filed Oct. 31, 2018, which is hereby incorporated by reference herein in its entirety.

What is claimed is:

1. An electronic device comprising:
    a voice receiving unit configured to receive a voice input;
    a first communication unit configured to communicate with an external device having a voice recognition function; and
    a control unit,
    wherein the control unit receives a notification indicating whether the external device is ready to recognize the voice input, via the first communication unit,
    wherein, in a case where the notification indicates that the external device is not ready to recognize the voice input, the control unit controls the external device to be ready to recognize the voice input via the first communication unit when the voice input received through the voice receiving unit includes a phrase corresponding to the external device, and
    wherein, in a case where the notification indicates that the external device is ready to recognize the voice input, the control unit does not control the external device via the first communication unit when the received voice input includes the phrase corresponding to the external device, the received voice input is received through the voice receiving unit.

2. The electronic device according to claim 1, further comprising a second communication unit,
    wherein power consumption of communication executed via the first communication unit is lower than power consumption of communication executed via the second communication unit, and
    wherein communication speed of communication executed via the second communication unit is faster than communication speed of communication executed via the first communication unit.

3. The electronic device according to claim 2, wherein, after the control unit controls the external device that is not ready to recognize a voice input, to be ready to receive a voice input, via the first communication unit, the control unit transmits information about an instruction given to the external device which is included in the received voice input, to the external device via the second communication unit.

4. The electronic device according to claim 3, wherein the information is voice data received by the voice receiving unit.

5. The electronic device according to claim 3,
    wherein the control unit converts voice data received by the voice receiving unit into an instruction for controlling the electronic device, and
    wherein the information is the instruction.

6. The electronic device according to claim 1,
    wherein the control unit determines a wake word of the electronic device and a wake word of the external device included in a received voice input, and
    wherein, in a case where the wake word of the electronic device is received, the control unit controls the electronic device to recognize the received voice input.

7. The electronic device according to claim 1, wherein, after the control unit controls the external device that is not ready to recognize a voice input, to be ready to recognize the voice input, via the first communication unit, the control unit informs a user that the external device is ready to recognize the voice input.

8. The electronic device according to claim 1, wherein the control unit receives a notification indicating whether the external device is ready to recognize a voice input, at the received interval via the first communication unit.

9. The electronic device according to claim 1, wherein, in a case where the control unit cannot receive a notification indicating whether the external device is ready to recognize a voice input from the external device, the control unit informs a user that the external device is not communicable.

10. The electronic device according to claim 1, further comprising an output unit configured to output voice,
wherein, after the control unit controls the external device that is not ready to recognize a voice input, to be ready to recognize a voice input, via the first communication unit, the control unit outputs the received voice input through the output unit.

11. The electronic device according to claim 1, wherein the first communication unit is compliant with a standard of Bluetooth®.

12. The electronic device according to claim 1, wherein the received voice input includes a phrase indicating the external device and an indicator for controlling the external device.

13. The electronic device according to claim 1, wherein the state where the external device is ready to recognize a voice input corresponds to a state where at least the voice receiving unit and a recognition unit for recognizing the voice input are turned on.

14. The electronic device according to claim 1, wherein the electronic device is a device connected to an external power supply to receive power from the external power supply.

15. A control method of an electronic device including a communication unit for communicating with an external device having a voice recognition function, the control method comprising:
receiving a voice input;
receiving a notification indicating whether the external device is ready to recognize the voice input via the communication unit,
controlling the external device to be ready to recognize the voice input, via the communication unit when the received voice input includes a phrase corresponding to the external device, in a case where the received notification indicates that the external device is not ready to recognize the voice input, and
not controlling the external device via the first communication unit when the received voice input includes a phrase indicating the external device, the received voice input is received through the voice receiving unit, in a case where the notification indicates that the external device is ready to recognize the voice input.

16. A non-transitory computer readable storage medium storing a program for causing an electronic device to execute a control method, the electronic device including a communication unit for communicating with an external device having a voice recognition function, the control method comprising:
receiving a voice input;
receiving a notification indicating whether the external device is ready to recognize a voice input, via the communication unit, and
controlling the external device to be ready to recognize a voice input, via the communication unit when the received voice input including a phrase corresponding to the external device is received, in a case where the notification indicates that the external device is not ready to recognize a voice input,
not controlling the external device via the first communication unit when the received voice input includes a phrase indicating the external device, the received voice input is received through the voice receiving unit, in a case where the notification indicates that the external device is ready to recognize the voice input.

17. An electronic device comprising:
a voice receiving unit configured to receive a voice input;
a first communication unit configured to communicate with a first external device;
a second communication unit configured to communicate with a second external apparatus different from the first external apparatus; and
a control unit,
wherein the control unit includes a voice recognition function for recognizing the received voice input received by the voice receiving unit,
wherein, the control unit causes the second external device to analyze the received voice input for executing the voice recognition function,
wherein, in a case where the voice recognition function is ON, the control unit controls the electronic device based on the received voice input received by the voice receiving unit,
wherein, in a case where the voice recognition function is OFF, the control unit repeatedly transmits a notification indicating that the voice recognition function is OFF, to the external device via the first communication unit and controls the second communication unit not to communicate with the second external device, and
wherein, in a case where a notification instructing to turn on the voice recognition function is received from the external device via the first communication unit, the control unit performs control to turn on the voice recognition function and starts communication with the second external device via the second communication unit.

18. The electronic device according to claim 17, wherein, in a case where the voice recognition function is ON, the control unit repeatedly transmits a notification indicating that the voice recognition function is ON, to the external device via the first communication unit.

19. The electronic device according to claim 17, wherein the control unit periodically transmits a notification indicating whether the voice recognition function is ON, to the external device via the first communication unit.

20. The electronic device according to claim 17,
wherein power consumption of communication executed via the first communication unit is lower than power consumption of communication executed via the second communication unit, and
wherein communication speed of communication executed via the second communication unit is faster than communication speed of communication executed via the first communication unit.

21. The electronic device according to claim 17, wherein the received voice input includes a phrase indicating the electronic device and an indicator for controlling the electronic device.

22. The electronic device according to claim 17, wherein the first communication unit is compliant with a standard of Bluetooth®.

23. The electronic device according to claim 17, further comprising a battery,
wherein the electronic device is a device which receives power from the battery.

24. A control method of an electronic device including a voice receiving unit for receiving a voice input, a first communication unit for communicating with an external device, a second communication unit configured to communicate with a second external apparatus different from the first external apparatus, and a voice recognition function for recognizing the received voice input received by the voice receiving unit, the control method comprising:
 controlling the electronic device based on the received voice input received by the voice receiving unit in a case where the voice recognition function is ON;
 causing the second external device to analyze the received voice input for executing the voice recognition function;
 repeatedly transmitting a notification indicating that the voice recognition function is OFF to the external device via the first communication unit and control the second communication unit not to communicate with the second external device, in a case where the voice recognition function is OFF, and
 performing control to turn on the voice recognition function and to start communication with the second external device via the second communication unit, in a case where a notification instructing to turn on the voice recognition function is received from the external device via the first communication unit.

25. A non-transitory computer readable storage medium storing a program for causing an electronic device to execute a control method, the electronic device including a voice receiving unit for receiving a voice input, a first communication unit for communicating with an external device, a second communication unit configured to communicate with a second external apparatus different from the first external apparatus, and a voice recognition function for recognizing the received voice input received by the voice receiving unit, the control method comprising:
 controlling the electronic device based on the received voice input received by the voice receiving unit in a case where the voice recognition function is ON;
 causing the second external device to analyze the received voice input for executing the voice recognition function;
 repeatedly transmitting a notification indicating that the voice recognition function is OFF, to the external device via the first communication unit and controlling the second communication unit not to communicate with the second external device, in a case where the voice recognition function is OFF, and
 performing control to turn on the voice recognition function and to start communication with the second external device via the second communication unit, in a case where a notification instructing to turn on the voice recognition function is received from the external device via the first communication unit.

* * * * *